No. 623,955. Patented Apr. 25, 1899.
W. W. GAGE & B. T. SEARING.
FILTER.
(Application filed Dec. 10, 1898.)
(No Model.)
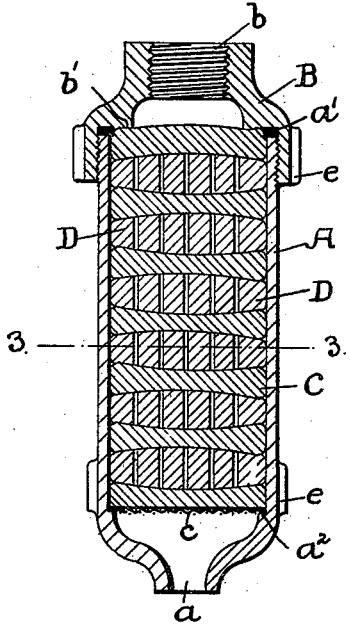
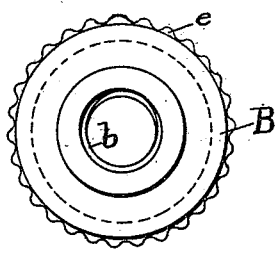
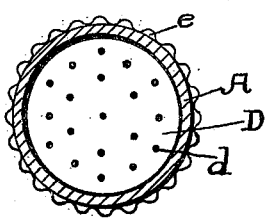
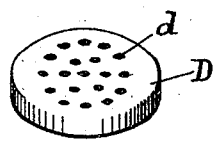
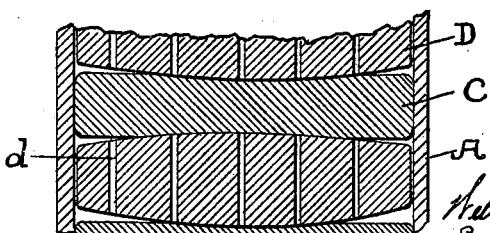
WITNESSES:
Axel V. Brken
W. N. Graham
INVENTORS
Wellesley W. Gage, and
Benjamin T. Searing
BY
Geo. N. Graham
ATTORNEY

UNITED STATES PATENT OFFICE.

WELLESLEY W. GAGE, OF NEW YORK, AND BENJAMIN T. SEARING, OF GARDEN CITY, NEW YORK; SAID SEARING ASSIGNOR TO SAID GAGE.

FILTER.

SPECIFICATION forming part of Letters Patent No. 623,955, dated April 25, 1899.

Application filed December 10, 1898. Serial No. 698,928. (No model.)

*To all whom it may concern:*

Be it known that we, WELLESLEY W. GAGE, a resident of the city and county of New York, and BENJAMIN T. SEARING, a resident of Garden City, county of Queens, State of New York, citizens of the United States of America, have invented new and useful Improvements in Filters, of which the following is a specification.

The present invention relates to filters for general use, and especially to that kind which can be removably attached to the source of the liquid to be filtered.

It has for its object to provide a mechanically simple and cheap filter with means whereby the same may be conveniently cleaned and recharged of its filtering material from time to time, as required.

It also has for its object the production of an efficient and cheap filtering material, which in the present invention is preferably made in the form required from a specially-prepared filtering fabric or felt.

With these objects in view the invention consists mainly of an improved filter structure composed of a circular barrel or casing closed at one end, with the exception of a suitable-sized outlet, and adapted to be closed at its other end with a removable cap having a nozzle or orifice, to which is secured the source of supply of liquid. The space between the ends is filled mainly with one or more layers or disks of the improved filtering material, preferably separated with perforated separating-disks, which may be of any suitable form and structure.

The improved filtering material consists, essentially, of wood pulp or fiber, preferably of that kind known as "sulfite" wood-pulp, which has been found especially adapted for the purpose. In order to make the filtering material suitably porous, yet a firmly-coherent fabric, a quantity of any suitable cloth fiber—such as wool, cotton, linen, or jute—is added to the wood fiber before felting, weaving, or otherwise making into a fabric. It has been found that the most suitable material for this purpose is wool, which not only renders the material porous, but also allows it to be made of great thickness and in the form of a felt. It has also been found advantageous in securing a homogeneous, coherent, and porous filtering material to add a certain proportion of cotton fiber or thread. When making a fabric of wood fiber or pulp and wool only, the proportions are preferably fifty per cent. of one and fifty per cent. of the other; but it may consist of as little as fifteen per cent. or twenty-five per cent. of wool, or even less. The quantity of cotton, when used, may amount to about twenty-five per cent. It is obvious, however, that any proportions may be varied within the scope of the invention.

Having now generally set forth the nature of the invention, a better understanding of the same may be had by a description of the improved filter with reference to the accompanying drawings, in which—

Figure 1 is a longitudinal sectional view of the improved filter. Fig. 2 is a plan view of the same. Fig. 3 is a cross-sectional view on the line 3 3 of Fig. 1. Fig. 4 is a perspective view of the improved separating-disks. Fig. 5 is an enlarged longitudinal sectional view of a portion of the filter.

Referring to the drawings, the filter barrel or casing A is provided at its bottom with an outlet $a$ and at its top with a removable cap B, having a screw-threaded opening $b$ for attachment with the source of water or other liquid. The cap is attached to the barrel in any suitable manner, such as by screwing the former over the latter. Knurled or corrugated surfaces $e$ are provided on the barrel and cap, respectively, to aid in detaching or attaching the two together. A gasket $a'$ is usually placed between the top edge of the barrel and the cap to prevent leakage. At the bottom of the barrel and upon an annular shoulder $a^2$, formed therein, there is placed a perforated sheet of metal or metallic wire-gauze $c$, upon which rest alternately the filter-pads, disks, or laminæ C and perforated separating-disks D. The top and bottom disks are preferably filtering-pads, and the whole series is held firmly in place under the annular shoulder $b'$ on the cap B.

The separating-disks are preferably made of unglazed porcelain or earthenware or other vitreous and porous material, so that by their porosity and the frictional agitation given to the liquid as it passes through them they may aid the filtering-laminæ. These disks are convex on both sides in order that the filtering-pads C shall be compressed more or less at their center and forced outward to be firmly in contact with the filter-barrel A, so as to prevent the liquid from escaping around the filtering material and to allow it to freely flow between the adjacent disks about center. (See Fig. 5.) The disks D are also perforated with holes $d$ to allow the water to readily percolate through them. The water also may flow around the edge of the disks, which need not tightly fit the filter-casing. (See Figs. 3 and 5.)

When it is desired to clean the filter or to replace one or more of the filtering-disks C, the barrel is unscrewed from the cap and the series of filtering taken out, usually by means of a small rod pushed through the orifice $a$. It is usual to remove the top filtering-pad and separating-disk and place the latter at the bottom of the pile, with the addition below it of a fresh disk of filtering material.

What is claimed is—

1. The herein-described fabric consisting of a mixture of wood fiber and another fiber adapted to be made into fabric.

2. The herein-described fabric or felt consisting of a mixture of wood fiber and wool.

3. The herein-described fabric or felt consisting of a mixture of wood fiber, wool and cotton.

4. The herein-described filtering material consisting of a fabric made of a mixture of wood fiber and another fiber adapted to be made into a felt or fabric.

5. The herein-described filtering material consisting of a fabric or felt made of a mixture of wood fiber and wool.

6. The herein-described filtering material consisting of a fabric or felt made of a mixture of wood fiber, wool and cotton.

7. A filter comprising a casing inclosing a plurality of disks of filtering material, alternating with separating-disks, having convex sides or surfaces, and arranged to be separated from the filtering-disks at or near their circumference, but to compress the center of the said filtering-disks and to force their edges against the wall of the said casing, substantially as described.

Signed at the city of New York, in the county of New York and State of New York, this 1st day of December, A. D. 1898.

WELLESLEY W. GAGE.
        BENJAMIN T. SEARING.

Witnesses:
  DANIEL E. DELAVAN,
  WARREN B. PLACE.